United States Patent
George et al.

(10) Patent No.: US 10,547,741 B2
(45) Date of Patent: Jan. 28, 2020

(54) SYSTEMS AND METHODS FOR PLACING CALLS IN A NON-DISTURBING MANNER

(71) Applicant: Avaya Inc., Basking Ridge, NJ (US)

(72) Inventors: Jibin George, Maharashtra (IN);
Dinesh Sonawane, Maharashtra (IN);
Susil Kumar Behera, Maharashtra (IN); Rakesh Kadu, Maharashtra (IN);
Srikant Ranjan Swain, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/892,556

(22) Filed: Feb. 9, 2018

(65) Prior Publication Data
US 2019/0253555 A1 Aug. 15, 2019

(51) Int. Cl.
*H04M 3/42* (2006.01)
(52) U.S. Cl.
CPC ......... *H04M 3/42195* (2013.01); *H04M 2203/2072* (2013.01)
(58) Field of Classification Search
CPC .................................................. H04M 3/42195
See application file for complete search history.

(56) References Cited

U.S. PATENT DOCUMENTS

| 6,018,671 | A | 1/2000 | Bremer | |
|---|---|---|---|---|
| 2009/0086941 | A1* | 4/2009 | Altberg | H04M 17/00 379/114.01 |
| 2010/0014653 | A1* | 1/2010 | Kumar | H04M 3/5191 379/210.01 |

OTHER PUBLICATIONS

"Scopia XT5000 Series User Guide Version 3.2"; RADVISION Ltd.; Jun. 9, 2013; https://downloads.avaya.com/css/P8/documents/100173489.
Silberman, Aylen; "Answering the Call: Yallo Aims to Revolutionize Phone Calls As We Know Them"; NoCamels—Israeli Innovation News; Israel; Jun. 16, 2016; http://nocamels.com/2016/06/yallo-app-revolutionizes-phone-calls/.

* cited by examiner

*Primary Examiner* — Nafiz E Hoque
(74) *Attorney, Agent, or Firm* — Stevens & Showalter LLP (57) ABSTRACT

Placing calls in a non-disturbing manner that includes receiving, by a communication server from a caller endpoint device, a request to place a call to a called endpoint device, wherein the request comprises an indication that the called endpoint device is to be notified about the call in a non-disturbing manner. The communication server also receives from the caller endpoint device, a time period for which a user of the caller endpoint device is available to receive a callback from the called endpoint device, a context associated with the call. Then, the communication server can forward to the called endpoint device, the call, wherein the call includes the time period and the context associated with the call.

20 Claims, 6 Drawing Sheets

| ENTRY ⤶302 | TIME ⤶304 | CALLER ID ⤶306 | CATEGORY ⤶308 | CALLBACK TIME PERIOD ⤶310 | CONTEXT ⤶316 |
|---|---|---|---|---|---|
| 1 | 10:00 | A | Incoming | | Topic 1 |
| 2 | 10:05 | B | Outgoing | ⤶312 | |
| 3 | 11:45 | C | Expecting | 2 hours | Topic 2 |
| 4 | 12:50 | D | Missed | ⤶314 | Topic 3 |
| 5 | 13:30 | E | Missed | 15:30 | |
| 6 | 14:50 | F | Expecting | | Topic 4 |

SYSTEMS AND METHODS FOR PLACING CALLS IN A NON-DISTURBING MANNER

BACKGROUND

The present disclosure relates generally to forwarding calls between endpoint devices, and, more particularly, to doing so in a manner that facilitates communication when both parties are available.

IP telephony allows various devices, often referred to as end-points, such as dedicated IP phones or specially configured personal computers, to initiate and receive telephone calls over the Internet or private data networks. Generally, the voice signal is compressed and translated into IP packets for transmission over the network(s).

IP telephony offers many benefits to both carriers and users that have contributed to its rapid deployment. Eventually, IP telephony technologies may replace traditional circuit switched telephony technologies, such as the Public Switch Telephone Network (PSTN). In the meantime, however, there is a substantial installed base of traditional telephone systems served by the PSTN and IP telephony must co-exist with traditional telephone systems.

A number of products are available that allow enterprises to integrate their traditional telephone systems, such as private branch exchange (PBX) switches with IP telephony features. The IP Office™ product, commercially available from Avaya, Inc., of Basking Ridge, N.J., supports voice and data communications. IP Office™ can be set up as a traditional PBX, an IP telephony server, or a combination of both. Thus, the IP Office™ product allows an enterprise to immediately implement traditional telephony, and evolve to IP over time, or to immediately implement a full IP solution.

Within this environment, there can be certain types of calls between colleagues in which the caller may not be sure how busy the called party is when making the call. This type of call may not be urgent and is only desired by the calling party if the called party happens to be available and willing to talk about a particular subject. Some communication channel other than a voice call, or even a voice call, can be used to ask the called party if they are available and, if not, then the called party is asked to call back when they are free. The called party when calling back may do so at a time that the original calling party is no longer available. This scenario is different than automatic callbacks request functionality already provided in many PBX systems. In those scenarios, the caller needs a callback when the called party is free regardless of the original caller's availability. Automatic callbacks merely check the availability of both phones of both the called party and the caller party to facilitate the callback.

While a presence server can provide an indication of how busy the called party is if they are presently communicating over one or more online channels, it does not provide any indication of busy the called party is doing offline tasks. Thus, there remains a need to provide communications that take into account both the called party's current availability and the time a caller is available to receive a callback.

BRIEF SUMMARY

One aspect of the present disclosure relates to a method of placing calls in a non-disturbing manner that includes receiving, by a communication server from a caller endpoint device, a request to place a call to a called endpoint device, wherein the request comprises an indication that the called endpoint device is to be notified about the call in a non-disturbing manner. The method also includes receiving, by the communication server from the caller endpoint device, a time period for which a user of the caller endpoint device is available to receive a callback from the called endpoint device; and receiving, by the communication server from the caller endpoint device, a context associated with the call. The method concludes with the communication server forwarding to the called endpoint device, the call, wherein the call includes the time period and the context associated with the call.

Another aspect of the present disclosure relates to a system for placing calls in a non-disturbing manner. The system includes a memory device, storing executable instructions and a processor in communication with the memory device. In particular, the processor when executing the executable instructions receives, from a caller endpoint device, a request to place a call to a called endpoint device, wherein the request comprises an indication that the called endpoint device is to be notified about the call in a non-disturbing manner. The processor also receives, from the caller endpoint device, a time period for which a user of the caller endpoint device is available to receive a callback from the called endpoint device and a context associated with the call. Ultimately, the processor forwards, to the called endpoint device, the call, wherein the call includes the time period and the context associated with the call.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 1:
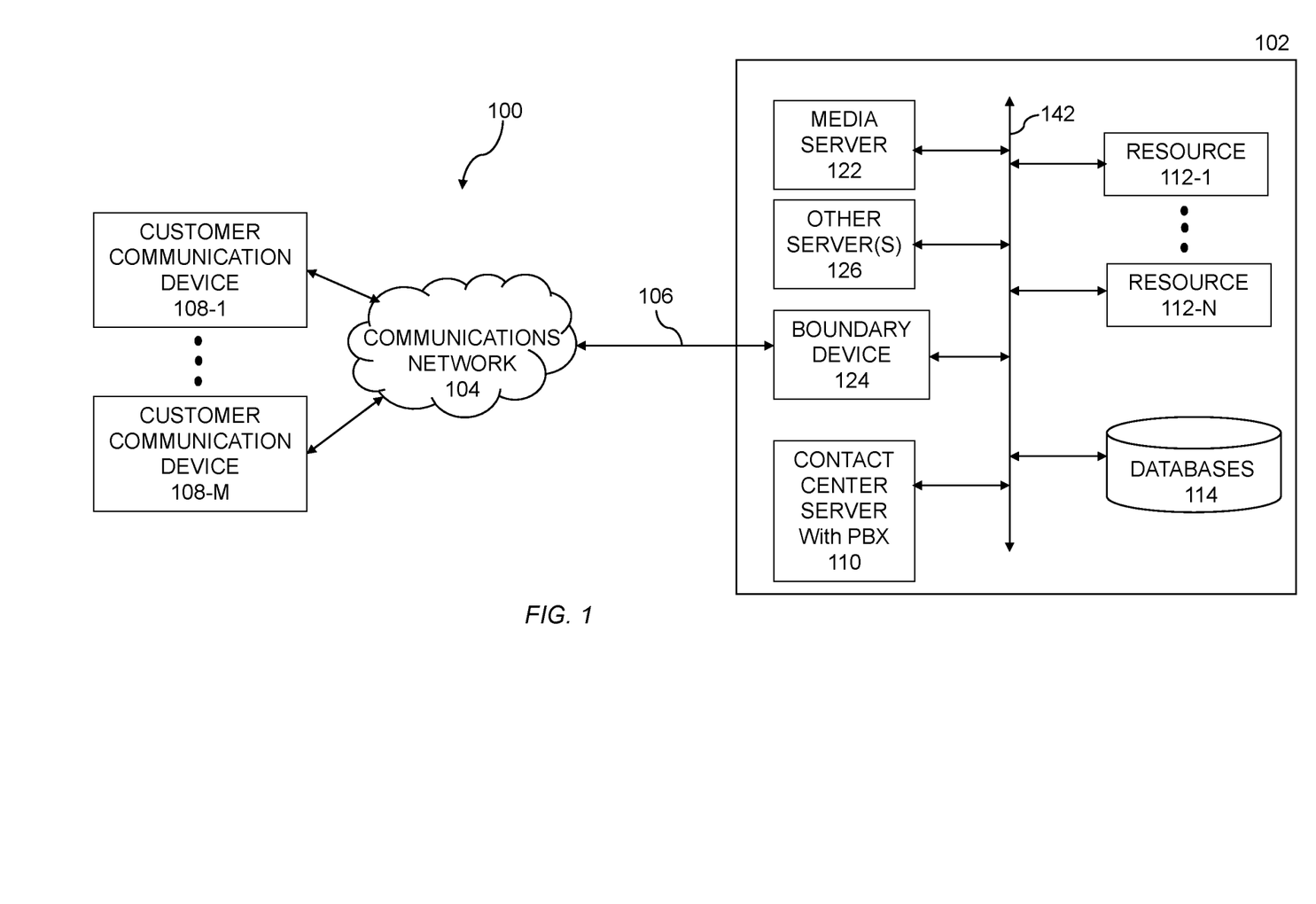
FIG. 1 illustrates a communications system architecture in accordance with the principles of the present disclosure.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M ≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN; not shown). A PBX (private branch exchange) is a telephone system within an enterprise that switches calls between enterprise users on local lines while allowing all users to share a certain number of external phone lines. The functionality of a PBX can, for example, be provided as one or more applications executing on the contact center server 110. The PBX functionality may, in some embodiments, be part of a communications manager application or a collaboration platform within the enterprise. In a more conventional embodiment, the PBX functionality may be implemented in a switch, either a virtual switch or a hardware switch.

In addition, although one central contact center server 110 is depicted in FIG. 1, two or more servers 110 may be provided in a single contact center 102 or across multiple separate LANs 142 owned and operated by a single enterprise, but separated by the communications network 104. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

Figure 2:
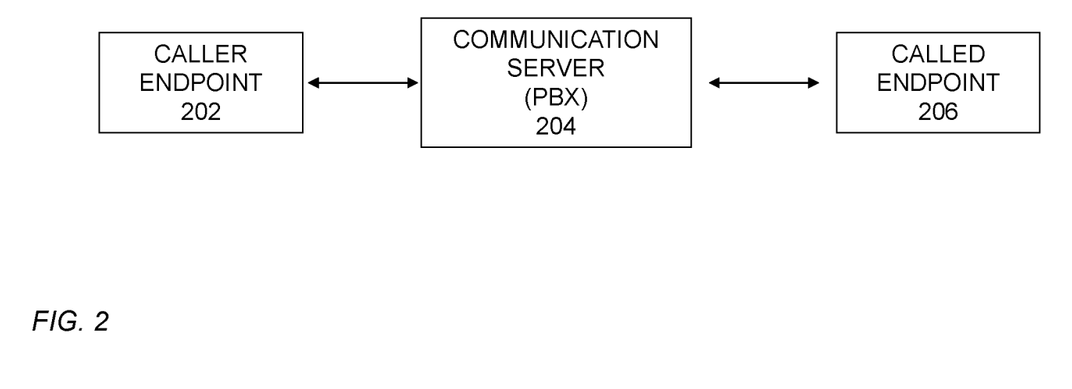
FIG. 2 illustrates a simple block diagram of a communications session in accordance with principles of the present disclosure.

FIG. 2 depicts a communication system in accordance with embodiments of the present disclosure. The other parts of the contact center 100 of FIG. 1 are not depicted in FIG. 2 in order to not obscure aspects of the present disclosure. The PBX functionality is embodied in a computer-based system referred to as a communication server 204 that includes one or more software applications executing on a server. The endpoints of a communication session can be the communication devices described above that are associated with the contact center resources 112-1 through 112-N. A calling (or caller) endpoint 202 places a call to a called (or callee) endpoint 206 via the communication server 204. The calling endpoint 202 can do this in response to a user entering a dialing sequence that includes an address associated with called endpoint 206. The communication server 204 processes the request, such as a PBX receiving any call request for another in-network address and based on the dialing sequence, the communication server 204 determines the called endpoint 206. The communication server 204, upon determining that a call is placed to the called endpoint 206, causes the called endpoint 206 to be presented with an informational message identifying the calling party as well as other information.

The calling endpoint 202 and the called endpoint 206 are variously embodied and may comprise a digital wired telephone, such as that featuring a detailed alphanumeric display, an analog telephone, which may or may not feature a display, a computer or other computational device operating a telephony application (e.g., soft phone), and/or a wireless telephone device configured to communicate via the communication server 204. The calling endpoint 202 may present a full alphanumeric description of available calling features and receive a user's input thereon. When embodied as a less feature-rich device, the calling endpoint 202 may associate certain numeric keys with functions, present audio prompts, and/or spoken command processing.

The called endpoint 206 may similarly be embodied as a full-featured digital telephony endpoint, analog telephone, wireless telephone, and/or telephony application. The called endpoint 206 comprises a display or other means to present the user thereof with calling party identification. For example, the called endpoint 206 may present an audio tone or spoken identification of the calling party, whether the calling party is an individual or group. In addition to the addresses associated with the endpoints 202 and 206 being numerical, the addresses may be SIP addresses or other alphanumeric addresses (e.g., "username@company.com"). Accordingly, addresses implementing characters beyond digits 0-9 and the pound and asterisk symbols, may dictate that the calling endpoint 202 and/or the called endpoint 206 be similarly configured to accommodate alphanumeric inputs and outputs.

In another embodiment, additional communication components may be provided between the calling endpoint 202 and the called endpoint 206. For example, additional public (e.g., Internet, public switched telephone network) and/or private networks (e.g., LAN, WAN, WiMax, cellular, etc.) may be utilized to facilitate communication between the calling endpoint 202 and the called endpoint 206.

Currently calls placed from a caller to a callee can be categorized as "Incoming", "Outgoing", or "Missed" on phone call logs. The logging of such phone calls can be performed by the communication server 204 and the categorization information and other information about the call can be pushed to the called endpoint 206 for display and also be available to other users or administrators in one or more logs maintained by the communication server 204.

Embodiments in accordance with the present disclosure contemplate a new category for phone calls—"Expecting". This category of phone calls will be forwarded to the called endpoint 206 by the communication server 204 regardless of whether or not the called party is on another call or not. Currently, a number of PBX systems offer a feature to "make silent calls". This feature allows calls to be delivered to a called endpoint 206 in a silent, non-disturbing manner. When making this type of call (i.e., "Expecting"), the caller (or calling) party will be prompted to enter a time period indicating when the caller party is available or interested in receiving a callback from the called party.

Embodiments in accordance with the present disclosure can be described by way of the following example scenario. At a particular time, John wants to call Bob, his manager who might be presently busy, to discuss a matter but only if Bob is willing and available at that particular time. Furthermore, John is available anytime in the next hour to have the desired conversation. In these circumstances, John does not want to make a direct call to Bob; so John will initiate an "Expecting" call with Bob and provide input indicating his availability for the next hour. According to some embodiments, John can also provide a context, topic or subject matter of the desired conversation. The result is that a new call entry will be displayed on the call log for Bob's phone in the "Expecting" category along with a time for which John will be available. If the topic information is provided, then this can be displayed in Bob's call log as well. Upon seeing the new entry in his call log, Bob can determine whether he is free or prepared to make a callback to John to discuss the matter. Bob can decide to call John back immediately or some other time in the time period for which John will be available. Entries for "Expecting" calls for which the available time period for a callback has expired can be displayed differently than for those entries whose time periods have not expired.

Thus, when making an "Expecting" call, the caller party will be presented with an additional field/button/menu item that allows them to indicate that the call is an "Expecting" call. Alternatively, a short code can be programmed into the PBX that the caller party can use to indicate to the communication server 204 that the present call is an "Expecting" call. For "Expecting" calls, the caller endpoint 202 will also provide an input opportunity for the caller party to enter a time period. The PBX, for example, could be programmed to recognize when a call being placed is an "Expecting" call and to then prompt the caller party to enter the time period information. The entered time period is forwarded to the called endpoint 206 and indicates the time period (starting from the time the "Expecting" call was initially placed) for which the caller party is available to receive a callback from the called party.

The call can be delivered to the called endpoint 206 but without an audible alert or normal ringing that accompanies call appearances. A simple notification alert such as, for example, highlighting of an entry in a call log display may be used to alert a called party to the receipt of an "Expecting" call in a non-disturbing manner. The phrase "non-disturbing notification" can include visual alerts and/or brief audible alerts but is intended to encompass a call alert that is different than the conventional ringing call alert that is intended to cause the called party to immediately answer the call. The "Expecting" call notification alerts the called party that the caller party desires, and is available for, receiving a future call from the called party rather than alerting the called party that the caller party is making a direct call to the called party. Assuming the called party was busy when the "Expecting" call is delivered, the called party can check the call log of the called endpoint 206 for any "Expecting" calls when the called party becomes available.

Figure 3:
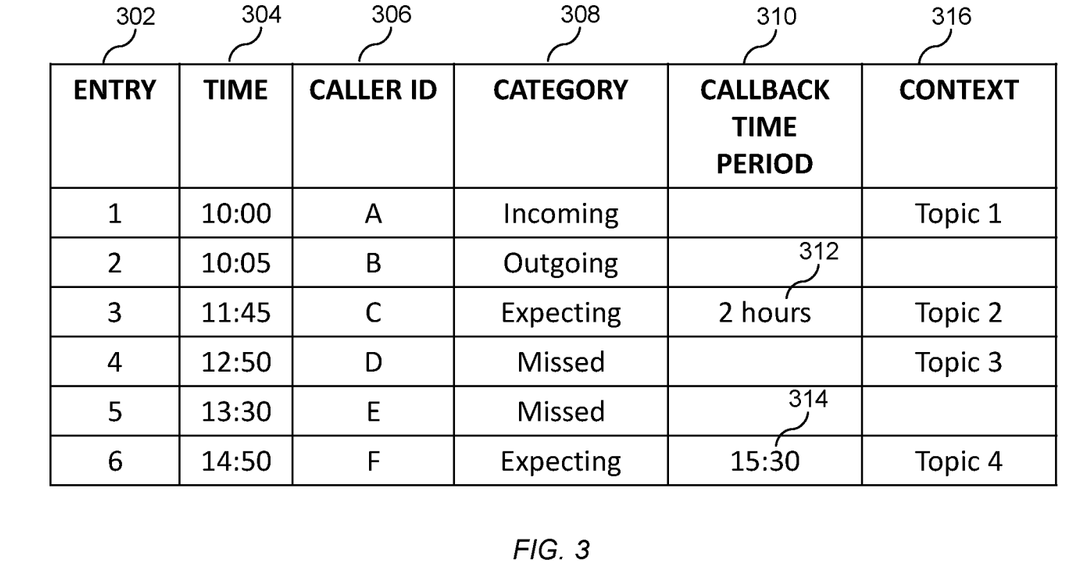
FIG. 3 illustrates an example call log in accordance with the principles of the present disclosure.

An example call log that can be displayed by the called endpoint 206 is depicted by the table of FIG. 3. The table has a column 302 for the entry number, a column 304 identifying the time of the call, a column 306 identifying the other party to the call, a column 308 identifying the type of call, a column 310 that indicates a time period that the calling, or caller, party is available for a callback from the called party, and a column 316 that indicates a subject/topic/context associated with the call. The time period can be provided in different ways. For example, the time period 312 is listed as "2 hours" and the called party can mentally determine from the time of the call when the 2-hour period is over. Alternatively, the time period 314 indicates an objective time (e.g., 15:30) that is automatically calculated by the communication server 204 based on when the call is placed and the pertinent time period input from the caller party when placing the "Expecting" call. In another embodiment, the calling party can provide the time period that is not directly tied to the time the call was placed. For example, the calling party may place an "Expecting" call at 10:00 AM and indicate that they will be available between 14:00 and 15:00 if the called party is available to call back at that time.

One of ordinary skill will recognize that the table of FIG. 3 is only an example and other information can be included in the call log. For example, the subject matter or topic of the call can be displayed for each entry in the call log as well. Furthermore, the table can have the rows displayed in different colors or with discernible highlighting such that "Expecting" calls for which the time period has expired are displayed differently than "expecting" call with remaining time in the time period for callback.

Figure 4:
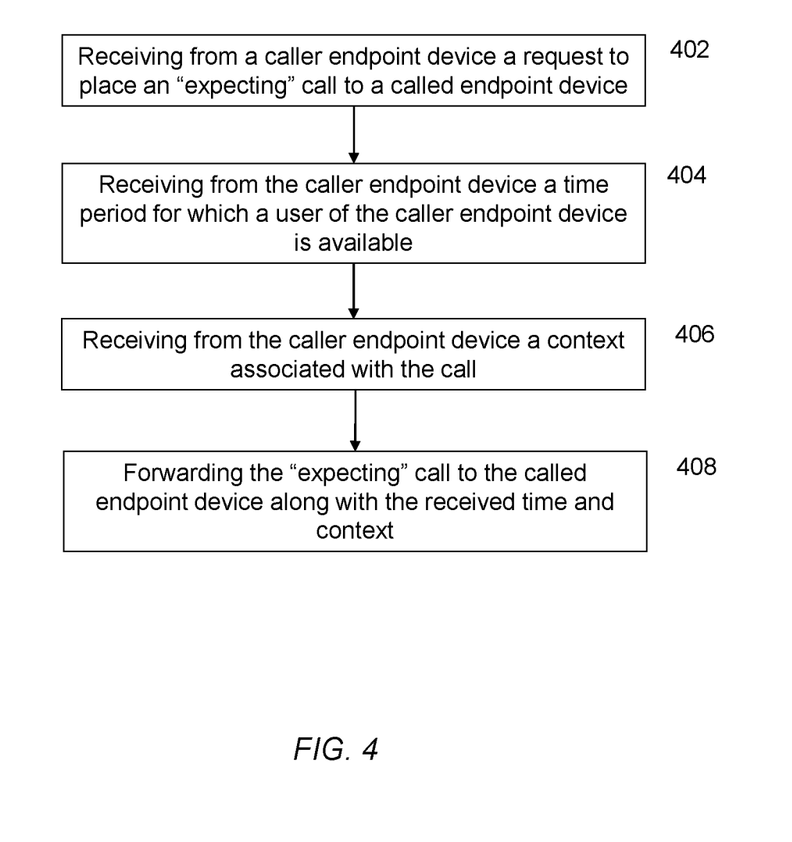
FIG. 4 is a flowchart of an example algorithm for providing "Expecting" calls in accordance with the principles of the present disclosure.

FIG. 4 is a flowchart of an example algorithm for providing "Expecting" calls in accordance with the principles of the present disclosure. In step 402, the communications server 204 receives, from a caller endpoint device, a request to place an "Expecting" call to a called endpoint device. As explained above, an "Expecting" call is one that is delivered to the called endpoint device regardless of whether or not the called party is on another call. Furthermore, because the call is labeled, or identified, as "Expecting" by the caller party, this provides an indication to the communication server 204 that the call is to be delivered such that the called endpoint device is notified about the call in a non-disturbing manner.

In step 404 and step 406, the communication server also receives from the caller endpoint device additional information about the "Expecting" call. In particular, the communication server 204 receives the context associated with the call and receives the timer information about when the caller party is available for a callback from the called party. In step 408, the "Expecting" call, the timer information, and the context information are all forwarded by the communication server 204 to the called endpoint device.

In the discussion above, the endpoint devices 202, 206 and the communication server 204 are described as receiving and forwarding information to one another. The information can, for example, be communicated via the SIP protocol, DTMF tones, proprietary applications running on the respective devices, or other computer-implemented methods of transferring information. The endpoint devices 202, 206 can provide user interfaces in which received information can be displayed to an associated user and through which input can be received from the associated user.

In other embodiments in accordance with the principles of the present disclosure, a caller party can attempt a conventional direct call to reach a called party and if the called party is unavailable to take the call, the called party can set a timer that informs the caller party that the called party is not currently available to handle the call. Rather than simply rejecting the call outright, the called party can set a timer for when the called party will be able to make a callback to the caller party.

Figure 5A:
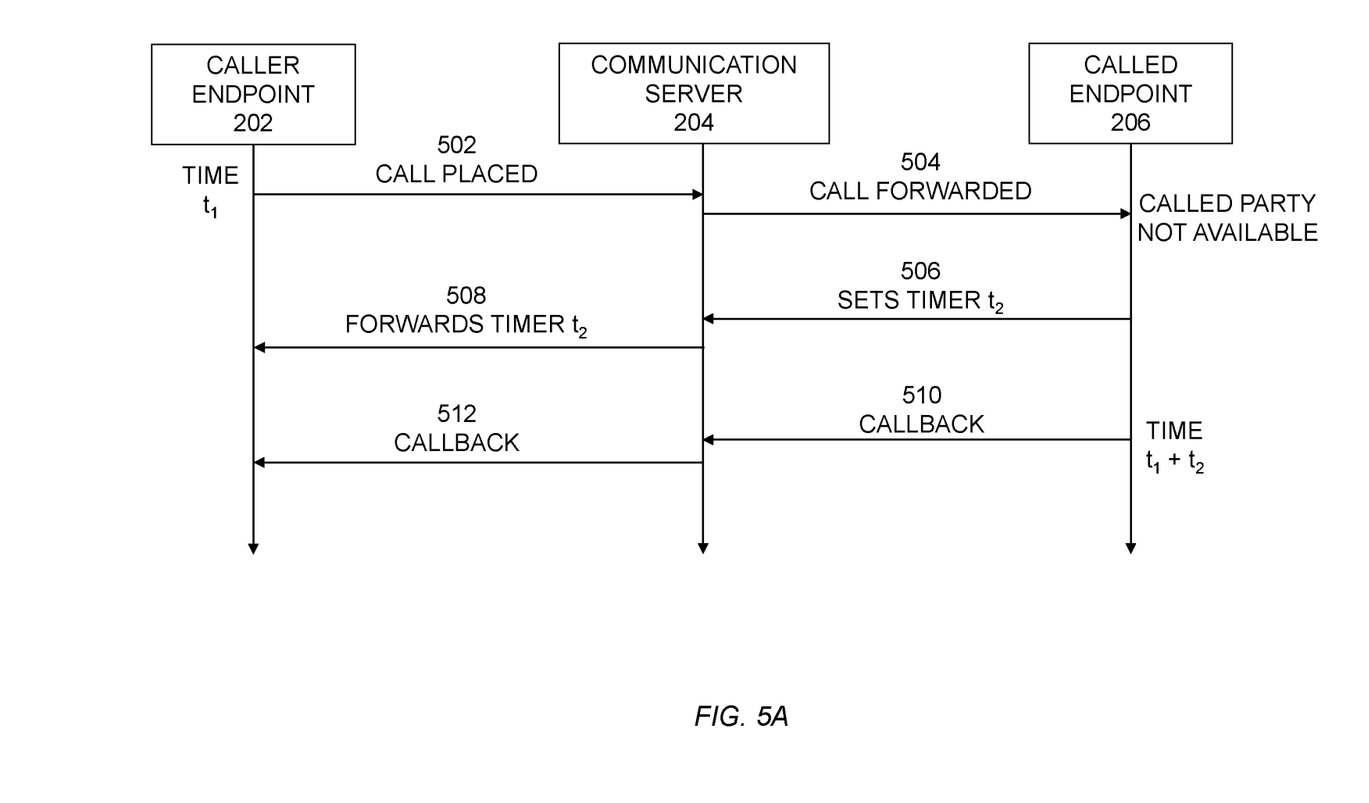
FIGS. 5A and 5B are ladder diagrams of example communication messages for setting a callback timer in accordance with the principles of the present disclosure.
Figure 5B:
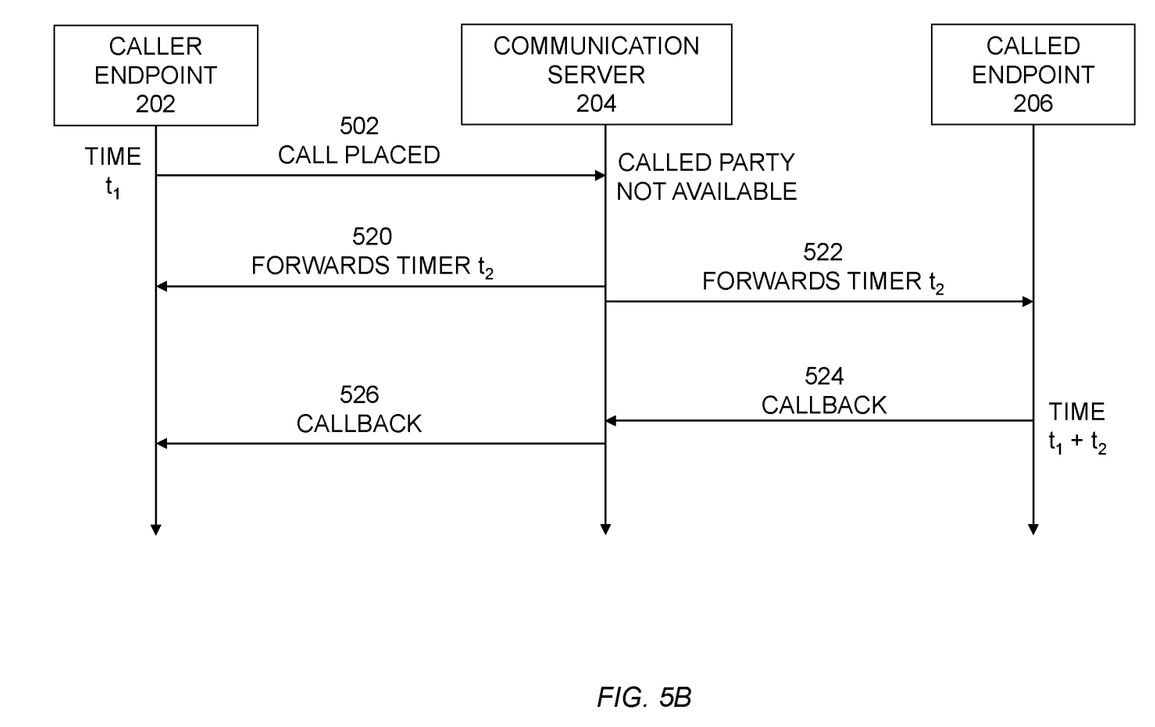

FIGS. 5A and 5B are ladder diagrams of example communication messages for setting a callback timer in accordance with the principles of the present disclosure. In FIG. 5A, the caller (or calling) party device 202 places a call at $t_1$. The call 502 connects the caller party device 202 with the communication server 204 which in turn forwards 504 the call to the called party device 206. The called party happens not to be available at the time the call is forwarded. Thus, based on input from the called party a timer is set for $t_2$ and communicated 506 to the communication server 204 along with an indication that the called party is not available. The timer information is forwarded 508 by the communication server 204 to the caller party device 202. An entry in the call log displayed on the caller party device can display the received information. Through this display, the caller party can be informed that the called party plans to call back before $(t_1+t_2)$. Thus, at the time $(t_1+t_2)$ the called party device 206 can initiate a callback 510, 512 to the original caller party device 202.

FIG. 5B illustrates a modified version of FIG. 5A. In FIG. 5B, the communication server 204 plays a larger role in the conversation. Same as before, the caller (or calling) party device 202 places a call at $t_1$. This time, however, the communication server 204 is aware of the status of the called party device 206 and determines the called party is unavailable. A configuration setting in the communication sever 204 for the particular called party can be set to a default timer value $t_2$. Without additional input from the called party, the communication server 204 can send the timer information 520, 522 to the caller party device and the called party device, respectively. Thus, the caller party becomes aware of the scheduled callback and the called party is reminded to make the callback. Thus, at the time $(t_1+t_2)$ the called party device 206 can initiate a callback 524, 526 to the original caller party device 202.

In the diagrams of FIG. 5A and FIG. 5B, the called party is depicted as initiating the call back at the scheduled time. However, one of ordinary skill will recognize that the messages exchanged between the different devices can be such that either the called party device or the caller party device can initiate the callback according to the scheduled time.

Thus, as described above, the timer can be a default value (e.g., 15 minutes) or it can be a dynamically generated value entered by the called party. A suggested timer value can be forwarded to the called party along with notification of the incoming call, from the communication server 204. The called party can select the suggested timer value or provide a different timer value. The timer value can also be set by the communication server 204 which, as part of its basic functionality, is aware of calls the called party may already be on and callback calls that have already been scheduled. Thus, even without input from the called party, the communication server 204 can generate a timer value for when the callback is planned to occur. The timer value is forwarded by the communication server 204 to the caller party so that they can know a time-frame for expecting a callback. The communication server 204 can also send a reminder to the called party at the expiration of the timer to remind them to make the callback. The functionality of generating a reminder at the appropriate time can also be implemented on the called party device if that device is robust enough to support this feature.

In the simplest example, the caller party does not have any availability restrictions and any received calls are well spaced apart. In this example, a first caller party may call in at 10:00 AM but the communication server 204 is aware that the called party is unavailable until 10:15. The communication server 204 does not connect the call to the called party but instead sends a call with a non-disturbing notification to the caller party device providing an indication that a callback will occur at 10:15. Similarly, if a second caller party calls for the called party at 10:15, the communication server 204 is aware of the already-scheduled callback at 10:15. Thus, the second caller party is informed that a callback will occur at 10:30 and the called party is provided a reminder of the callback that is to occur at 10:30.

In the above example scenario, the two calling parties placed calls at least 15 minutes apart. In other example scenarios, adjacent calling parties may place calls more closely spaced than the default timer value of the system (e.g., 15 minutes). In the above example, if the second calling party placed their call at 10:10, then the timer value would be adjusted so that the callback would be scheduled to occur at 10:30 and not at 10:25. Thus, the communication server 204 does not simply use the default timer value of 15 minutes but, instead, sets the timer value for the second calling party to be 20 minutes to account for the likelihood that scheduling a callback at 10:25 will likely cause a conflict with the first callback that was scheduled for 10:15. If a third calling party subsequently called at 10:30, then the default value of 15 minutes can be used and a callback scheduled for 10:45.

In another example embodiment, the callback timer value can be adjusted to account for a call taking longer than expected. For example, if the default timer value is 15 minutes because each call is expected to last about that long, a first calling party that calls at 10:15 may result in a callback scheduled for 10:30. If a second calling party calls at 10:30, then a callback can be scheduled for 10:45 using the default timer value of 15 minutes. The second calling party is provided a notification that the callback is scheduled for 10:45. During the callback occurring between 10:30 and 10:45, the called party may realize that the call is likely going to extend past the 10:45 scheduled time for the second callback. The called party device can be used to send the communication server 204 an indication that the callback time for the second calling party needs to be extended. The called party device can provide to the communication server 204 a new time to re-schedule the callback or the communication server 204 can automatically extend the schedule callback time by a default value (e.g., 5 minutes) every time the called party device provides an indication that an extension is needed. Each extension of time results in a new notification being sent to the second calling party with a new time that they can expect a callback from the called party. As an alternative to the called party providing an indication that a time extension is needed, the communication server can determine that the called party device is engaged in an ongoing call and automatically send an extension notice to the caller party device that the callback time has been extended.

The "Expecting" call functionality described above can be combined with the callback timers in a number of different ways. In one example, the caller party places a normal call (as described above) and the called party sets a timer indicating a scheduled callback. In response, the caller party may decide that they are unavailable at the scheduled callback time and can send an "Expecting" call that provides a different time period for which they are available for a callback.

In a different scenario, the caller party can initiate an "Expecting" call to the called party that identifies the time period for which the caller party will be available for a callback. In response to the "Expecting" call, the communication server 204 determines a value for a callback time that meets the schedule of the called party. When the callback timer value coincides with a time in the caller party's available time frame, the caller party can be informed of the scheduled callback and the called party can be reminded to make the scheduled callback. When the scheduled callback is to occur at a time outside of the caller party's available time, a warning or similar notification can be sent to both the caller party and the called party informing them that the callback will not be scheduled. The communication server 204 can then allow either one of the parties to adjust their timer values for when the callback can be scheduled.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method of placing calls in a non-disturbing manner, comprising:

receiving, by a communication server from a called endpoint device, a time that the called endpoint device schedules a first callback to a caller endpoint device;

forwarding, by the communication server to the caller endpoint device, the time that the called endpoint device schedules the first callback;

subsequent to forwarding the time that the called endpoint device schedules the first callback, receiving, by the communication server from the caller endpoint device, a request to place a call to the called endpoint device, wherein the request comprises an indication that the called endpoint device is to be notified about the call in a non-disturbing manner;

receiving, by the communication server from the caller endpoint device, a time period for which a user of the caller endpoint device is available to receive a second callback from the called endpoint device;

receiving, by the communication server from the caller endpoint device, a context associated with the call; and forwarding, by the communication server to the called endpoint device, the call, wherein the call includes the time period and the context associated with the call.

2. The method of claim 1, wherein the indication that the called endpoint device is to be notified about the call in a non-disturbing manner comprises a category label which is assigned by the caller endpoint device to the call.

3. The method of claim 1, wherein the time period begins at a time the request to place the call was received.

4. The method of claim 1, comprising:
receiving during the time period, by the communication server from the called endpoint device, the second callback for the caller endpoint device; and
connecting, by the communication server, the second callback to the caller endpoint device.

5. The method of claim 1, comprising:
determining, by the communication server, that the time period has expired; and
sending, by the communication server to the called endpoint device, an indication that the time period has expired.

6. The method of claim 1, comprising:
forwarding, by the communication server, the call to the called endpoint device even when the called endpoint device is currently on another call.

7. The method of claim 1, comprising:
determining, by the communication server, that the request to place the call comprises an indication that the called endpoint device is to be notified about the call in a non-disturbing manner.

8. The method of claim 7, comprising:
in response to determining that the request to place the call comprises an indication that the called endpoint device is to be notified about the call in a non-disturbing manner, prompting, by the communication server, the caller endpoint device to provide the time period for which a user of the caller endpoint device is available to receive the second callback.

9. The method of claim 1, comprising:
prior to receiving the time that the called endpoint device schedules the first callback, receiving, by the communication server from the caller endpoint device a first normal call request for the called endpoint device; and
forwarding, by the communication server to the called endpoint device, the first normal call request.

10. The method of claim 9, wherein receiving the request to place the call to the called endpoint device is in response to the time that the called endpoint device schedules the first callback.

11. A system for placing calls in a non-disturbing manner, the system comprising:
a memory device, storing executable instructions;
a processor in communication with the memory device, the processor when executing the executable instructions:
receives from a called endpoint device, a time that the called endpoint device schedules a first callback to a caller endpoint device;
forwards to the caller endpoint device, the time that the called endpoint device schedules the first callback;
subsequent to forwarding the time that the called endpoint device schedules the first callback, receives, from the caller endpoint device, a request to place a call to the called endpoint device, wherein the request comprises an indication that the called endpoint device is to be notified about the call in a non-disturbing manner;
receives, from the caller endpoint device, a time period for which a user of the caller endpoint device is available to receive a second callback from the called endpoint device;
receives, from the caller endpoint device, a context associated with the call; and
forwards, to the called endpoint device, the call, wherein the call includes the time period and the context associated with the call.

12. The system of claim 11, wherein the indication that the called endpoint device is to be notified about the call in a non-disturbing manner comprises a category label which is assigned by the caller endpoint device to the call.

13. The system of claim 11, wherein the time period begins at a time the request to place the call was received.

14. The system of claim 11, wherein the processor when executing the executable instructions:
receives, during the time period from the called endpoint device, the second callback for the caller endpoint device; and
connects the second callback to the caller endpoint device.

15. The system of claim 11, wherein the processor when executing the executable instructions:
determines that the time period has expired; and
sends, to the called endpoint device, an indication that the time period has expired.

16. The system of claim 11, wherein the processor when executing the executable instructions:
forwards the call to the called endpoint device even when the called endpoint device is currently on another call.

17. The system of claim 11, wherein the processor when executing the executable instructions:
determines that the request to place the call comprises an indication that the called endpoint device is to be notified about the call in a non-disturbing manner.

18. The system of claim 17, wherein the processor when executing the executable instructions:
in response to determining that the request to place the call comprises an indication that the called endpoint device is to be notified about the call in a non-disturbing manner, prompts the caller endpoint device to provide the time period for which a user of the caller endpoint device is available to receive the second callback.

19. The system of claim 11, wherein the processor when executing the executable instructions:
   prior to receiving the time that the called endpoint device schedules the first callback, receives from the caller endpoint device a first normal call request for the called endpoint device; and
   forwards to the called endpoint device, the first normal call request.

20. The system of claim 19, wherein receiving the request to place the call to the called endpoint device is in response to the time that the called endpoint device schedules the first callback.

* * * * *